United States Patent
Ilyin et al.

(10) Patent No.: US 12,066,984 B2
(45) Date of Patent: Aug. 20, 2024

(54) METHOD OF CREATING AND USING AN EXECUTABLE FILE FORMAT WITH A DYNAMIC EXTENSIBLE HEADER

(71) Applicant: LIMITED LIABILITY COMPANY "PEERF", Moscow (RU)

(72) Inventors: Nikolay Olegovich Ilyin, Moscow (RU); Vladimir Nikolaevich Bashev, Moscow (RU)

(73) Assignee: LIMITED LIABILITY COMPANY "PEERF", Moscow (RU)

(*) Notice: Subject to any disclaimer, the term of this patent is extended or adjusted under 35 U.S.C. 154(b) by 580 days.

(21) Appl. No.: 17/104,737

(22) Filed: Nov. 25, 2020

(65) Prior Publication Data
US 2021/0157772 A1    May 27, 2021

(30) Foreign Application Priority Data
Nov. 26, 2019  (RU) .......................... RU2019138069

(51) Int. Cl.
G06F 16/178    (2019.01)
(52) U.S. Cl.
CPC ............................... G06F 16/1794 (2019.01)
(58) Field of Classification Search
CPC .................................................. G06F 16/1794
See application file for complete search history.

(56) References Cited

U.S. PATENT DOCUMENTS

| | | | | |
|---|---|---|---|---|
| 6,499,137 B1 * | 12/2002 | Hunt | ................... | G06F 9/44521 717/177 |
| 8,549,647 B1 | 10/2013 | Mason et al. | | |
| 10,127,381 B2 | 11/2018 | Zakorzhevsky et al. | | |
| 2001/0042069 A1 * | 11/2001 | Petrov | ....................... | G06F 8/54 707/999.102 |
| 2012/0290870 A1 * | 11/2012 | Shah | ..................... | H04W 12/35 714/E11.073 |

FOREIGN PATENT DOCUMENTS

| | | | | |
|---|---|---|---|---|
| CN | 101222365 A | * | 7/2008 | |
| EP | 1 560 112 | | 8/2005 | |
| EP | 1 749 266 | | 2/2007 | |
| WO | WO-2004042639 A1 | * | 5/2004 | ............... G06F 8/34 |

* cited by examiner

*Primary Examiner* — Mark D Featherstone
*Assistant Examiner* — Faezeh Forouharnejad
(74) *Attorney, Agent, or Firm* — Nixon & Vanderhye PC

(57) ABSTRACT

Compact size, extensibility, and built-in security is provided by enclosing into a file's header custom specifications and preventing file execution without knowing these specifications. The format allows for defined sections, organizing preliminary pre-processing of data before operating system (OS) execution. A file header, including standard and user-defined sections, is created and read by delegated processing; forming an executable file's header with inclusive specifications using the abstract data syntax description language (ASN.1); encoding header with compression encoding rules (PER); and creating a separate header section of interfaces table for components. Program assembly output includes an executable file in machine and/or byte code with a dynamic extensible header encoded according to ASN.1 with PER. During execution, the OS reads the file header and determines available sections, including links to external components and their interfaces, sections with machine/byte code, including user-defined sections, and links to delegate-processes for user sections data preparation.

11 Claims, 5 Drawing Sheets

```
--
-- Abstract Syntax Notion (ASN.1) file for Executable File Format (EFF) Version 1
--

ECO-EFF DEFINITIONS AUTOMATIC TAGS ::=
BEGIN

Header-EFF ::= SEQUENCE               < Header >
{
    version           INTEGER,        < A versioning support > standardHeader    StandardHeader-EFF,   < Standard sections header > nonStandardHeader NonStandardHeader-EFF OPTIONAL,   < Optional header of non-standard sections >
    ...
}      < Extensibility >
```

FIG.2

New executable file format (ECO OS)

METHOD OF CREATING AND USING AN EXECUTABLE FILE FORMAT WITH A DYNAMIC EXTENSIBLE HEADER

CROSS-REFERENCE TO RELATED APPLICATIONS

This application also claims the benefit of Russian Patent Application 2019138069 filed on Nov. 26, 2019. The content of the abovementioned application is incorporated by reference herein.

TECHNICAL FIELD

The present technical solution relates to the field of computing, in particular, to a method of creating and using an executable file format with a dynamically expandable header.

BACKGROUND

A solution is known from the prior art (U.S. patent Ser. No. 8,549,647B1, US AIR FORCE, publ. Jan. 10, 2013), which describes how to classify a portable executable file. The disadvantage of this solution is that classification is not actually a solution for embedding new specifications, interpreting and processing them.

There are also known solutions that describe the formats of executable files. Such solutions are, for example, disclosed in the following documents: U.S. Pat. No. 10,127,381B2, EP1560112A1, EP1749266A2.

However, the solutions known from the prior art have limited functionality, in particular, none of them offers a mechanism for embedding arbitrary specifications in an executable file and processing them by the operating system, as well as a way to solve the problem of compatibility of an executable file with operating systems of different generations as they develop.

SUMMARY OF THE INVENTION

This technical solution is aimed at eliminating the disadvantages inherent in existing solutions from the prior art.

The technical problem to be solved by the claimed technical solution is a new computer-implemented method of creation and use of an executable file format with a dynamically expandable header.

The main differences between the claimed solution and those known from the prior art are that:
in the claimed solution, the header of the executable file is described in abstract syntax using the encoding rule.

In the file formats known from the prior art, the file header has a description in the form of fixed data structures that describe the file format and its main characteristics, such as: type, format version, processor architecture, virtual address of the entry point, sizes and offsets of the remaining parts of the file, etc.

in the declared solution a separate section of the interface table for the components is created. At the same time, this feature is absent in the executable files known from the prior art.

in the declared solution, a delegating process for processing non-standard sections is launched. At that, the files known from the prior art do not have a delegating process.

The problem to be solved by the stated solution is to create a new format of an executable (by computer) file (program), which will provide the necessary flexibility in terms of:
extensibility—as the level of science and technology develops and new specifications and architectures of operating systems appear, the new format will provide backward compatibility and support for new standards and specifications at the same time.

This capability is achieved through the use of the Abstract Data Syntax Description Language (ASN.1) in conjunction with compressed Packet Encoding Rules (PER) standards, defined in ITU-T X.691 (ISO/IEC 8825-2:2015), which allow extensibility. These coding rules encode only the information that is present, and this, in turn, enables to describe a completely new format due to extensibility. The specification itself will include all its previous versions and all their extensions, ensuring backward compatibility, but will encode only the information of the new format.

In addition, by using a number of approaches of the disclosed solution the following possibilities will be achieved:
a formation of an executable file format with a dynamic expandable header, which describes the standard header fields for the operating system (OS) according to the specification, and also allows you to add new fields in the header, based on specifications from third-party developers;
a provisioning of possibility of expansion for the next versions of format;
a support in the proposed executable file format of the possibility of execution within the specification on various hardware architectures, including the ability to include sections with bytecode for execution in the corresponding virtual machines (like JVM), including specifications for the component OS;
an ensuring the compactness of headers (to reduce the size of the file), when including fields of various specifications in the header. Fields, that are unused, will not be included in the header.

The technical result is the creation of the new format of the executable file of computer programs, which has both a compactness and flexible extensibility due to the use of abstract data syntax description language (ASN.1) together with the compressed encoding rules (PER) in the formation of a file header, and does not depend on an architecture of the computer used.

The new executable file format will be a flexible tool for the application developer, since it allows not to have rigid restrictions in terms of the platforms used, and in the field of support for various standards and specifications, according to which a file with an applied task or system application (OS component) should be processed.

There are additional technical results, that appear when solving this technical problem, namely:
a protection of executable files against an insertion of malware and scripts by specifying file parameters (checksum, size, etc.) in the encoded file header.

Since the use of compressed encoding rules (PER) leads to another additional effect, in contrast to other well-known rules (BER, DER, CER) and the structured approach to describing the header, this provides another layer of protection against malware.

Without knowing the specification of an executable file format, it is impossible to decode the header. In this case, the specification describing the header of the executable file format may include various specifications for encrypting code sections, data sections and service sections. Together with the policies and attributes of access rights on a file system, own protection level of the executable file format makes it a laborious task to inject a virus into an executable file.
- an embedding any certificates and protocols in the file header;
- an increased security, due to the encryption of the file meta information in the header (only the developer of the specification can read the header and run this file);
- a reduced size of a file and a space saving on the physical media/memory due to the use of compressed encoding and an absence of unnecessary information that is not required for file execution.

In a preferred embodiment, a computer-implemented method for creating and using an executable file format with a dynamic extensible header, performed using a computing device, is claimed, wherein:
a. during an assembly of the executable file, the following steps are performed:
  a processing files with source code, object files and libraries, as a result of this processing sections of code and data section are formed;
  a forming an executable file header using the language of abstract data syntax description (ASN.1);
  an encoding into the header of the executable file information about the code sections and the sections of the data in the header and then compressing header with encoding rules (PER);
  a creating a separate section of an interface table for components;
  a forming specialized sections, with a specification defined by the user or the application developer, and launch the delegating process of generating these sections. An information on these sections is encoded in the header, including such an optional non-standard specification;
b. at the output, an executable file is formed in the form of a machine or byte code, or their combination with a dynamic expandable header encoded according to the compressed encoding rules (PER);
c. during the execution of the file, an operating system reads the file header and determines the available sections, including references to external components and their interfaces, sections with machine or byte code, including user-defined sections, and references to delegate processes for processing these user's sections data.

Another preferred embodiment of the invention is a system, comprising
  at least one processor;
  at least one data storage non-transitory medium, containing a program's executable file;
  at least one memory, which contains machine-readable instructions which, when executed by the at least one processor, are effective in executing a program file created and executed via method described above.

DESCRIPTION OF DRAWINGS

The implementation of the invention will be further described in accordance with the accompanying drawings, which are presented to clarify the essence of the invention and in no way limit the scope of the invention. The following drawings are attached to the application:
FIG. 2 illustrates an example of an ASN.1 header.

DETAILED DESCRIPTION OF THE INVENTION

Figure 1:
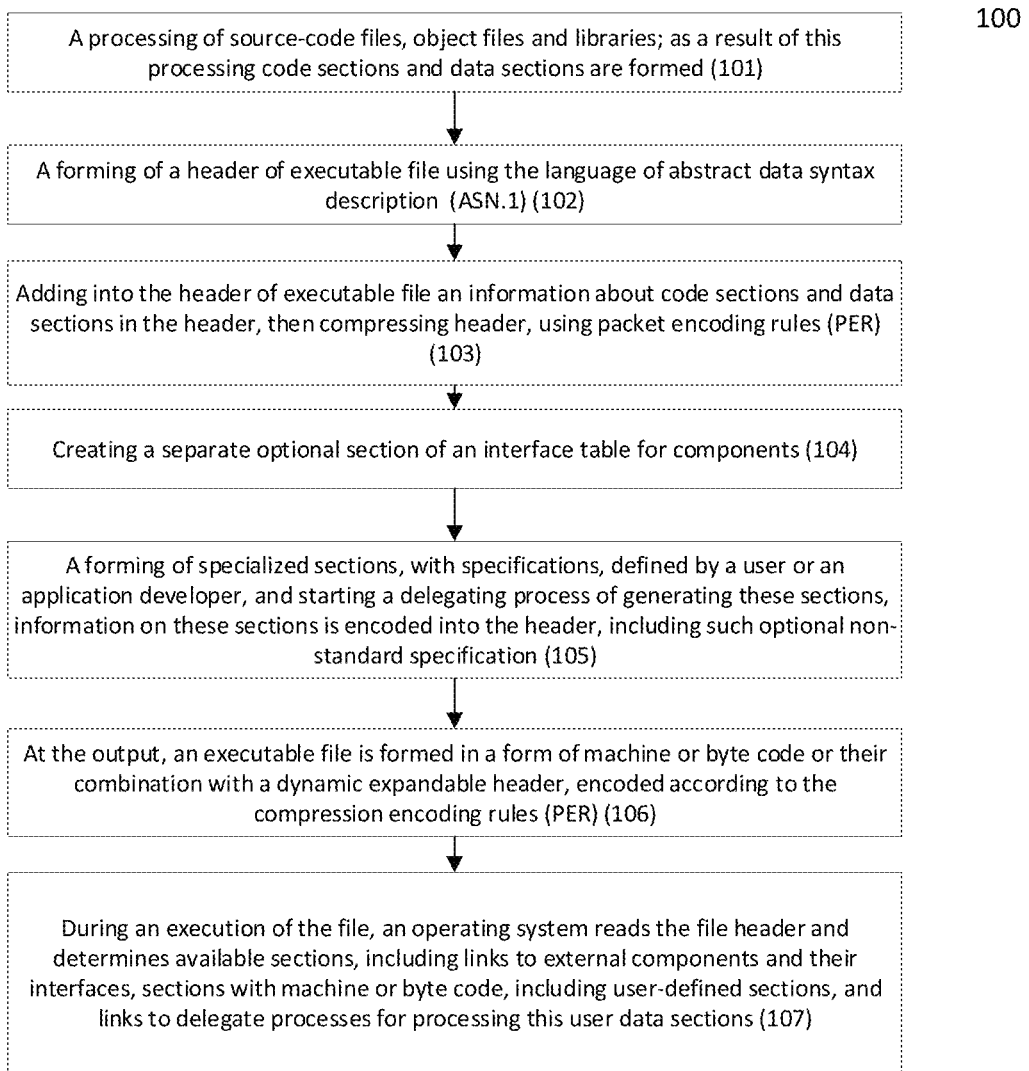
FIG. 1 illustrates the claimed computer-implemented method.

In the following detailed description of an implementation of the invention, numerous implementation details are set forth to provide a thorough understanding of the present invention. In view of the fact that specialists in the field of designing operating and computer systems are familiar with commonly used terms, components and procedures, these methods, names and components have not been described in detail so as not to obscure the features of the present invention and the distinctive possibilities of its use.

In addition, it will be clear from the above description that the invention is not limited to the above implementation. Numerous possible modifications, changes, variations and substitutions, while retaining the spirit and form of the present invention, will be apparent to those skilled in the art.

The present invention is directed to a computer-implementable method for creating and using an executable file format with a dynamic expandable header.

The most famous and popular executable file formats are as follows:
1) ELF (*nix OS format):

```
#define EI_NIDENT 16
typedef struct {
        unsigned char   e_ident[EI_NIDENT];
        Elf32_Half      e_type;
        Elf32_Half      e_machine;
        Elf32_Word      e_version;
        Elf32_Addr      e_entry;
        Elf32_Off       e_phoff;
        Elf32_Off       e_shoff;
        Elf32_Word      e_flags;
        Elf32_Half      e_ehsize;
        Elf32_Half      e_phentsize;
        Elf32_Half      e_phnum;
        Elf32_Half      e_shentsize;
        Elf32_Half      e_shnum;
        Elf32_Half      e_shstrndx;
} Elf32_Ehdr;
typedef struct {
        unsigned char   e_ident[EI_NIDENT];
        Elf64_Half      e_type;
        Elf64_Half      e_machine;
        Elf64_Word      e_version;
        Elf64_Addr      e_entry;
        Elf64_Off       e_phoff;
        Elf64_Off       e_shoff;
        Elf64_Word      e_flags;
        Elf64_Half      e_ehsize;
        Elf64_Half      e_phentsize;
        Elf64_Half      e_phnum;
        Elf64_Half      e_shentsize;
        Elf64_Half      e_shnum;
        Elf64_Half      e_shstrndx;
} Elf64_Ehdr;
```

2) Mach-o (Mac OS X format):

```
struct mach_header {
    unsigned long    magic;     /* Mach magic number identifier */
```

-continued

```
cpu_type_t      cputype;       /* cpu specifier */
cpu_subtype_t   cpusubtype;    /* machine specifier */
unsigned long   filetype;      /* type of file */
unsigned long   ncmds;         /* number of load commands */
unsigned long   sizeofcmds;    /* size of all load commands */
unsigned long   flags;         /* flags */
};
```

3) MZ, PE (Windows OS formats):

```
typedef struct _IMAGE_DOS_HEADER {
    WORD e_magic;         /* 00: MZ Header signature */
    WORD e_cblp;          /* 02: Bytes on last page of file */
    WORD e_cp;            /* 04: Pages in file */
    WORD e_crlc;          /* 06: Relocations */
    WORD e_cparhdr;       /* 08: Size of header in paragraphs */
    WORD e_minalloc;      /* 0a: Minimum extra paragraphs needed */
    WORD e_maxalloc;      /* 0c: Maximum extra paragraphs needed */
    WORD e_ss;            /* 0e: Initial (relative) SS value */
    WORD e_sp;            /* 10: Initial SP value */
    WORD e_csum;          /* 12: Checksum */
    WORD e_ip;            /* 14: Initial IP value */
    WORD e_cs;            /* 16: Initial (relative) CS value */
    WORD e_lfarlc;        /* 18: File address of relocation table */
    WORD e_ovno;          /* 1a: Overlay number */
    WORD e_res[4];        /* 1c: Reserved words */
    WORD e_oemid;         /* 24: OEM identifier (for e_oeminfo) */
    WORD e_oeminfo;       /* 26: OEM information; e_oemid specific */
    WORD e_res2[10];      /* 28: Reserved words */
    DWORD e_lfanew;       /* 3c: Offset to extended header */
} IMAGE_DOS_HEADER, *PIMAGE_DOS_HEADER;
#define IMAGE_DOS_SIGNATURE        0x5A4D        /* MZ   */
#define IMAGE_OS2_SIGNATURE        0x454E        /* NE   */
#define IMAGE_OS2_SIGNATURE_LE     0x454C        /* LE   */
#define IMAGE_OS2_SIGNATURE_LX     0x584C        /* LX   */
#define IMAGE_VXD_SIGNATURE        0x454C        /* LE   */
#define IMAGE_NT_SIGNATURE         0x00004550    /* PE00 */
``` and have a structural description of headers, which, in turn, depend on the size of the fields (16-bit, 32-bit, 64-bit), their alignment and byte order (big-endian and little-endian).

In contrast to the formats of executable files known from the prior art, the proposed technical solution performs another method of forming the header of the executable file format, namely, the use of the abstract data syntax description language (ASN.1), which does not depend on the machine architecture, bit width and byte order. To encode an ASN.1 header of an executable file format, the compression encoding rules (PER) are used.

Below is an example of an ASN.1 header for comparison with the abovementioned structured header descriptions:

```
--
-- Abstract Syntax Notion (ASN.1) file for Executable File Format (EFF) Version 1
--
ECO-EFF DEFINITIONS AUTOMATIC TAGS ::=
BEGIN
Header-EFF ::= SEQUENCE
{
    version            INTEGER,
    standardHeader     StandardHeader-EFF,
    nonStandardHeader  NonStandardHeader-EFF OPTIONAL,
    ...
}
```

An additional effect of this approach is the minimum file size, since only the information that is available is encoded, i.e. data that matters, as opposed to the structured approach, in which the structure is encoded in its entirety, even if the data fields are not used or are reserved.

Another additional effect is a support for format versioning and an ability to extend the header with a custom format, which is not supported by any of the known executable file formats.

One of the main differences of the claimed executable file format is the presence of a table of interfaces, which is an alternative to import and export tables, but does not limit a use of the latter. The architecture of the component OS is based on the use of pointers to interfaces, the use of the interface table is the most efficient way to bind (import) and resolve (export) the names of dynamic libraries (components) functions. For example, in COM-OS technology, the interfaces are virtual functions' tables, which in turn contain pointers to member functions, i.e. do not have names, thus the use of import and export tables in the classic embodiment is not applicable.

FIG. 1 shows a computer-implemented method (100) for creating and using an executable file format with a dynamic expandable header, executed with a computing device.

At the same time, the assembly of an executable file is carried out by a set of tools (toolchain) during which the following steps are performed:

At step (101), source code files, object files and libraries are processed, as a result of this processing, code sections and data sections are generated.

At step (102), the header of an executable file is generated using the abstract data syntax description language (ASN.1), and at step (103), information about code sections and data sections in the header is encoded in the header of an executable file.

A separate section of an interface table for components (104) is created. The created section of an interface table contains a pointer to a system interface for accessing the interfaces of imported components and their functions, and a pointer to the component factory interface for registering the components in the interface bus and accessing the interfaces of the components themselves.

At step (105), specialized sections are generated with a specification defined by the user or an application developer, and a delegating process for generating these sections is started, information on these sections is encoded in the header, including this optional non-standard specification.

User-defined sections can store any information, intended for the preparation of the executable code for a successful launch.

One of the main problems that developers of computer systems are trying to solve is the protection of programs' executable code from outside interference. To solve such problems, they resort to various tricks, insert various encryptors directly into the executable code, which modify the executable code and then transfer control to the modified code.

At the same time, developers cannot encrypt headers of executable files, since an OS will not be able to decode and process these headers, and cannot transfer control to another process to process them, such mechanisms, in principle, are not provided. In the claimed solution, such mechanisms are provided in the form of a non-standard fields for including a non-standard specification (for example, an encryption algorithm or other information) and an appropriate delegating process for processing this non-standard specification (for example, a component that performs data encryption) and performing additional manipulations with the code or data before giving control to an executable code of a task itself.

Another such use-case may be an inclusion of a specialized, i.e. for a narrow range of tasks, specification for working with microcontrollers I/O ports. The fact that addresses and a number of ports for one microcontroller family are different, and a memory volume is limited, forces developers using conditional compilation mechanisms for same microcontroller family to compile several versions of the executable code that differ only in the I/O port addresses. If the logic for selecting the port address, depending on the microcontroller series, is inserted directly into an executable code, then a code size grows (there may be problems with memory capacity limit) and extra processor time is consumed to check a microcontroller' series and select the appropriate I/O port address.

Using the proposed mechanism, namely an extension of the header to accommodate a non-standard (defined by an application developer himself) specification, a delegating process for processing this specification and additional preparation of the executable code, will allow developers to create more versatile solutions. In this case a delegating process will take over (based on manufacturer specifications) modification of the executable code by substituting the addresses of the I/O ports for the corresponding series of a microcontroller.

In practice, this can be implemented as follows: a program data area contains a table with the addresses of the input/output ports, from where the program will read them (addresses) and access them (at the specified addresses). And a delegating process is responsible for specifying the correct I/O port addresses for the corresponding microcontroller in this table.

Accordingly, at a stage of forming the executable file format, when an assembly tool (compiler/linker) specifies appropriate parameters (a need to start the delegating process of processing the table of I/O ports), the delegating process is launched, which, based on the non-standard specification, forms (encodes) the header in the optional non-standard header field with information about the offset of the address of the beginning of this table and the additional necessary information, determined by a developer, to find this table and performing appropriate manipulations (substituting the addresses of the input/output ports of the corresponding series of microcontrollers) at the stage of preparing the program for launch.

Next, at the output, an executable file is generated in the form of machine code or byte code, or their combination with a dynamic expandable header, encoded according to the compression encoding rules (PER) (at step (106)).

At step (107), during an execution of a file, an operating system reads the file header and determines available sections, including links to external components and their interfaces, sections with machine or byte code, including user-defined sections, and links to delegate processes for processing these user's data sections.

In the claimed solution, the sections of amendments and sections containing debugging information are additionally formed, information about which is encoded in a header of executable file.

In addition, specialized sections store information, designated to prepare an executable code for successful launch.

The executable file format for a component OS must contain and provide the necessary data for a successful preparation and launch of the program.

The architecture of a component OS can be made with a possibility of simultaneous operation of microkernels of different generations (for example, OS created according to the Adapted Component Object Model (ACOM) architecture), which is directly related to a development of the hardware, which in turn requires an executable file format to be backward compatible and independent from the machine architecture. Also, the component OS provides developers with an ability to create specialized OS' solutions depending on an application' requirements, which in turn also requires from the executable file format, in addition to standard file data processing means, to include non-standard data, determined by a developer himself based on the requirements for specialized applications.

FIG. 2 shows the header of an executable file format using abstract data syntax description language (ASN.1), which is architecture independent, supports backward compatibility and versioning, extensible and can optionally include a custom header.

The standard header includes a description of the executable file type, microkernel generation, architecture, processor ID, bit width, byte order, list of entry points, section descriptions such as program code sections, data sections, static and global variable sections, amendment sections, debug information sections, metadata sections, interface sections, resource sections, import sections, export sections and a number of other auxiliary/service sections defined by the specification of the executable file format.

One of the main differences of new executable file format is a presence of an interfaces section, containing interface table, which is an alternative to import and export tables, but does not restrict a use of the latter. The presence of this table is due to an architecture of the component OS, in which an interaction is based on the use of interfaces according to the Adapted Component Object Model (ACOM) technology.

Figure 3:
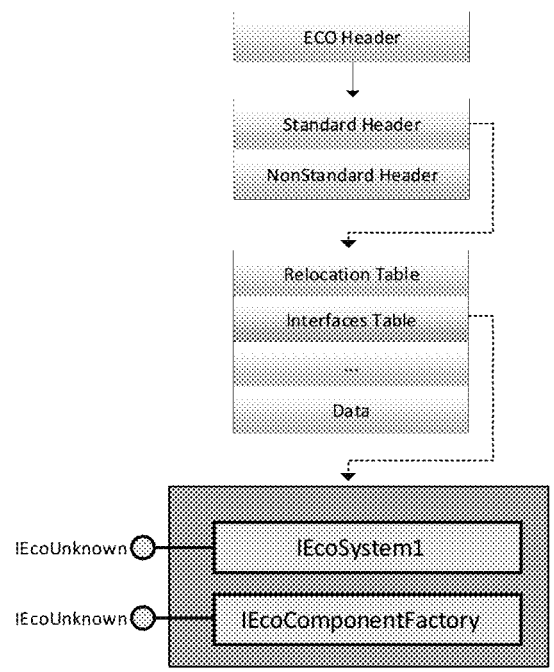
FIG. 3 illustrates an example of an executable file format header.

FIG. 3 shows an example of an executable file format' header.

Figure 4:
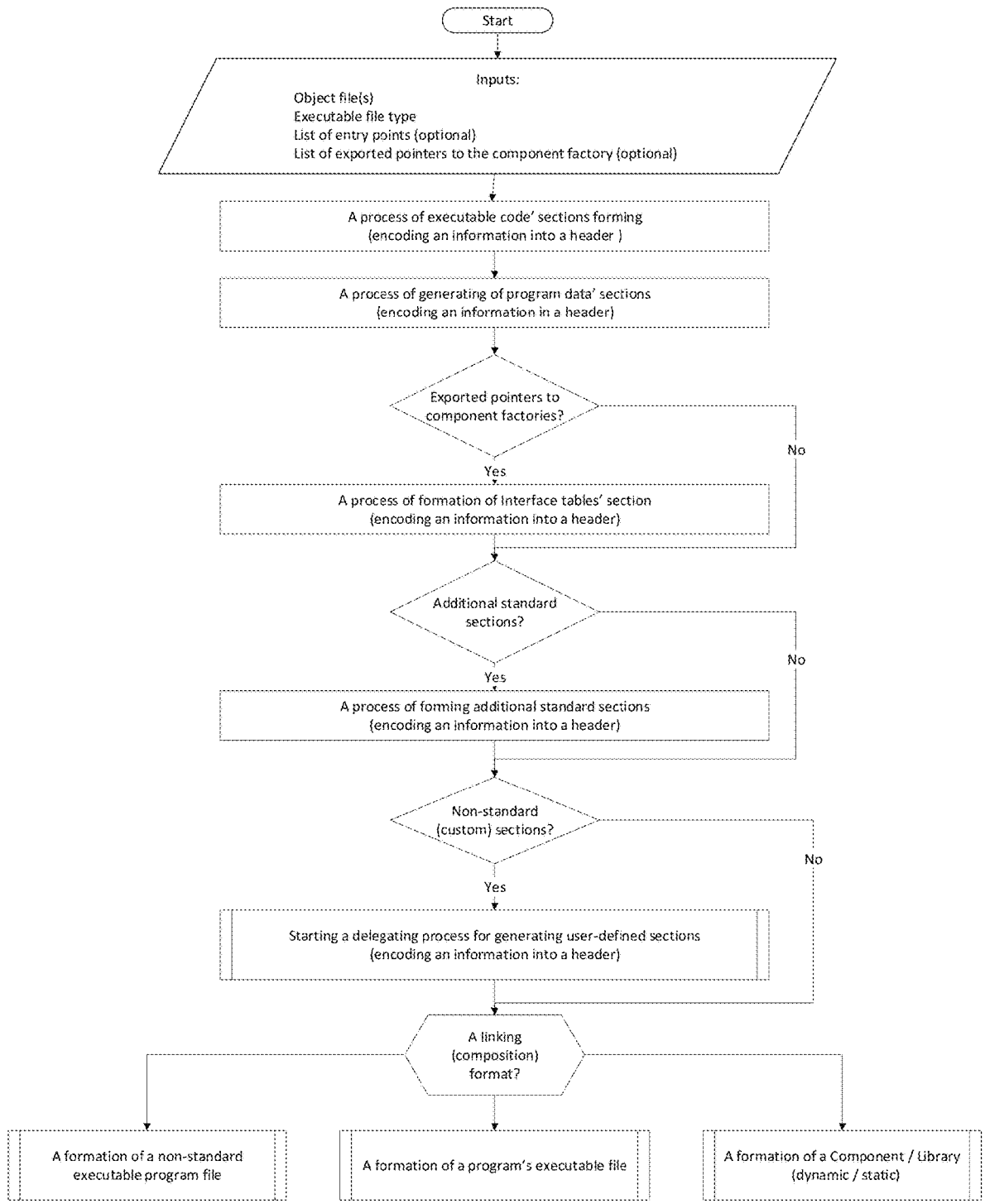
FIG. 4 illustrates a flowchart of a process for generating an executable file.

FIG. 4 shows a process of generating a format of an executable file. When processing object files and libraries, code sections and data sections are created, information about which is encoded in a header of an executable file format. In cases where exported pointers to component factories are defined, a section of interface table is created in which the UGUID of the component and a pointer to the interface of the component factory of the corresponding component (address is the offset in the code relative to the base address) are written for each component. Also, sections of corrections, debugging information sections, and other sections can be additionally formed. An information about each section is encoded in the header.

An important difference of disclosed solution is an ability to create specialized sections, formed by a developer. These sections store any information, that a developer needs to place in the format to prepare for an executable code successful launch. Specialized sections mean an ability to include in a file code additional information, necessary for a developer to execute this file, or, as an option, to use a file in some specific conditions or specific application areas.

In cases when it is necessary, i.e., for example, when the developer needs to enable encryption keys, a delegating process of generating these specific sections, defined by a developer is launched. The information on these sections is encoded in the header, including a non-standard specification defined by a developer. The output is the specified format of an executable file.

Figure 5:
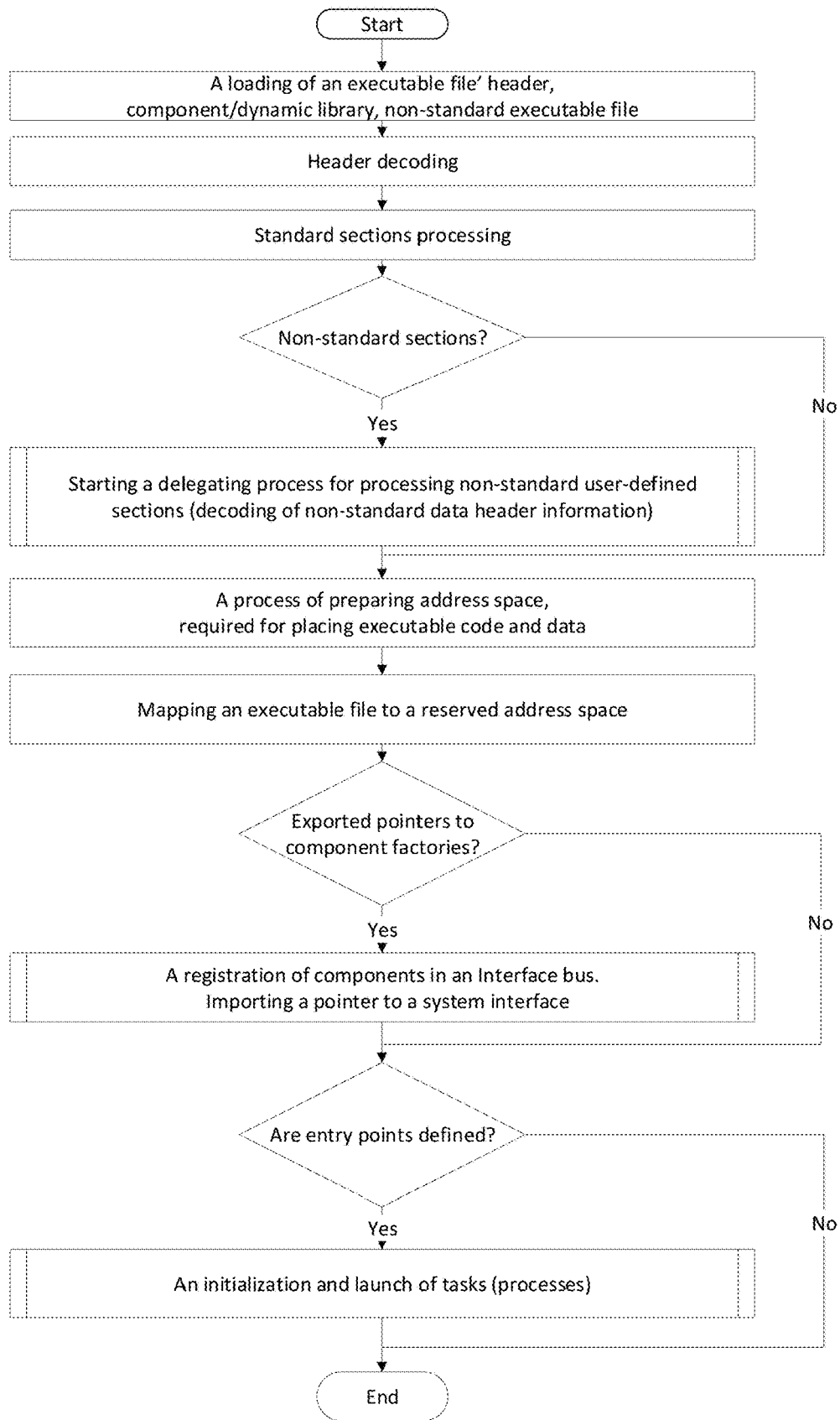
FIG. 5 illustrates a flowchart of a preparation process for launching an executable file.

FIG. 5 shows the process of preparing and running an executable file.

In the first step, a system reads a header of an executable file and decodes it according to a specification. Next, it processes information on standard sections. If a non-standard specification is included in the header, the system loads the corresponding component and delegates a processing of non-standard sections. Based on an information received from the header and the analysis of the sections, the system prepares necessary address space for executable file placing. When an executable file is mapped to the reserved address space and there are additional sections, such as edit sections, the system additionally performs addresses edits.

In other cases, if there is an interface table section, a system registers the loaded components in an interface bus. For executable files, in which entry points are defined, the system initializes and starts corresponding tasks (processes).

In the present application materials, the preferred disclosure of an implementation of the claimed technical solution has been presented, which should not to be construed as limiting other embodiments thereof, which do not depart from the scope of the claims and are apparent to those skilled in the relevant arts.

The invention claimed is:

1. A computer-implemented method of creating and using an executable file format with a dynamic extensible header, performed by a computing device, the method comprising, during assembly of an executable file:

processing files with source code, object files and libraries, such that code sections and data sections are formed;

forming a header of the executable file using Abstract Syntax Notation One (ASN.1) description language;

adding into the header of the executable file information about code sections and data sections in the header and compressing the header, using Packed Encoding Rules (PER);

creating a separate optional section of an interface table for components; and forming specialized sections, with specifications, defined by a user or an application developer, and starting a delegating process of generating these sections, information on these sections being encoded in the header, including such optional non-standard specification;

wherein at the output, an executable file is formed in a form of machine or byte code or their combination with a dynamic expandable header, encoded according to the Packed Encoding Rules (PER); and wherein during an execution of the file, an operating system reads the file header and determines available sections, including links to external components and their interfaces, sections with machine or byte code, including user-defined sections, and links to delegate processes for processing this user section data.

2. A system, comprising:

at least one processor;

at least one data storage non-transitory medium, containing a program executable file; and at least one memory, which contains machine-readable instructions which, when executed by the at least one processor, are effective in executing a program file, created and executed via the method according to claim 1.

3. The method according to claim 1, wherein the header has a header format that is machine independent.

4. The method according to claim 1, wherein the header includes the interface table.

5. The method according to claim 4, wherein the interface table includes pointers to interfaces.

6. The method according to claim 5, wherein the interface table includes data for binding and resolving names of dynamic libraries functions.

7. The method according to claim 5, wherein the interface table contains a pointer to a system interface for accessing interfaces of imported components and their functions, and a pointer to a component factory interface for registering the components in an interface bus and accessing the interfaces of the components themselves.

8. The method according to claim 5, wherein the interface table includes a single record with a component identifier for each external component used for all associated functions.

9. The method according to claim 4, wherein the interface table is usable in addition to import and export tables.

10. The method according to claim 1, wherein an arbitrary number of specialized sections is formable, each formed specialized section having an associated specification, and processing of the formed specialized section being delegable to software components available in the operating system.

11. The method according to claim 10, wherein the executable file is formed so that a program data area contains a table with addresses of input/output ports, from where a program will read and access them, and wherein the delegating process specifies the addresses of the input/output ports.

* * * * *